(12) United States Patent
Amar et al.

(10) Patent No.: US 11,697,735 B2
(45) Date of Patent: Jul. 11, 2023

(54) SOLID OLEAGINOUS COMPOSITIONS

(71) Applicant: TOTAL MARKETING SERVICES, Puteaux (FR)

(72) Inventors: Anupam Amar, Courbevoie (FR); Louis Plancq, Levallois-Perret (FR)

(73) Assignee: TOTAL MARKETING SERVICES, Puteaux (FR)

( * ) Notice: Subject to any disclaimer, the term of this patent is extended or adjusted under 35 U.S.C. 154(b) by 1013 days.

(21) Appl. No.: 16/465,722

(22) PCT Filed: Dec. 6, 2017

(86) PCT No.: PCT/FR2017/053411
§ 371 (c)(1),
(2) Date: May 31, 2019

(87) PCT Pub. No.: WO2018/104658
PCT Pub. Date: Jun. 14, 2018

(65) Prior Publication Data
US 2019/0292369 A1  Sep. 26, 2019

(30) Foreign Application Priority Data
Dec. 7, 2016  (FR) ...................... 1662029

(51) Int. Cl.
C08L 91/00 (2006.01)
C08K 5/24 (2006.01)
C09D 11/06 (2006.01)
C08K 5/06 (2006.01)
C08K 5/16 (2006.01)

(52) U.S. Cl.
CPC .............. *C08L 91/00* (2013.01); *C08K 5/06* (2013.01); *C08K 5/16* (2013.01); *C08K 5/24* (2013.01); *C09D 11/06* (2013.01); *C08L 2205/06* (2013.01); *C08L 2207/322* (2013.01)

(58) Field of Classification Search
CPC ..... C08L 2207/322; C08L 91/00; C08K 5/21; C08K 5/16; B60C 1/00
USPC ....................................................... 106/285
See application file for complete search history.

(56) References Cited

U.S. PATENT DOCUMENTS

| 3,026,568 A | 3/1962 | Moar |
| 4,305,812 A | 12/1981 | Shih et al. |
| 4,455,216 A | 6/1984 | Angevine et al. |
| 5,186,972 A | 2/1993 | Williams et al. |
| 2004/0069685 A1 | 4/2004 | Inomata et al. |
| 2011/0223225 A1* | 9/2011 | Mezzenga ............... A23P 10/30 426/417 |
| 2011/0290695 A1 | 12/2011 | Thomas |
| 2013/0298800 A1 | 11/2013 | Lapalu et al. |
| 2016/0304793 A1 | 10/2016 | Merdrignac et al. |
| 2017/0218177 A1 | 8/2017 | Vincent et al. |

FOREIGN PATENT DOCUMENTS

| EP | 2254127 A1 * | 11/2010 | ............... H01B 3/20 |
| JP | 2010-126635 A | 6/2010 | |
| WO | 2009/153324 A1 | 12/2009 | |
| WO | 2012/168380 A1 | 12/2012 | |

OTHER PUBLICATIONS

Translation of Jan. 4, 2021 Office Action issued in Chinese Patent Application No. 201780075896.1.
"Printing Materials and Suitability"; the second edition, edited by Xuesong Jiang; p. 156; Northeast Forestry University Press; Aug. 31, 2016.
Apr. 16, 2018 Search Report issued in International Patent Application No. PCT/FR2017/053411.
Lee, Jung Moo et al., "Separation of Solvent and Deasphalted Oil for Solvent Deasphalting Process", Fuel Processing Technology, vol. 119 (2014), pp. 204-210.
Apr. 16, 2018 Written Opinion issued in International Patent Application No. PCT/FR2017/053411.

* cited by examiner

*Primary Examiner* — Doris L Lee
(74) *Attorney, Agent, or Firm* — Oliff PLC

(57) ABSTRACT

An oleaginous composition is solidified at ambient temperature and in divided form, includes an oil, including at least one hydrocarbon oil of petroleum origin, and at least one chemical organogelator additive. The composition is used as a plasticiser, in particular in tyre production, or as a solvent, in particular in ink production. A method transports and/or stores and/or handles oleaginous compositions that are solid at ambient temperature and in divided form.

19 Claims, No Drawings

SOLID OLEAGINOUS COMPOSITIONS

The present invention relates to oily compositions which are solid under cold conditions and which are in divided form, and to the use thereof as plasticizer, notably for the manufacture of tires and as solvent, notably for the manufacture of inks. The invention also relates to a process for transporting and/or storing and/or handling oily compositions which are solid under cold conditions and which are in divided form.

PRIOR ART

Plasticizers are essential components in the formulation of elastomers, notably of rubber-based compositions. The main role of the plasticizer is to give the elastomer flexibility and transformability. It reduces the glass transition temperature of the elastomer, making it flexible, even at low temperatures.

Solvents are essential components in the formulation of inks, notably of compositions based on polymeric resin. The main role of the solvent is to wet and dissolve the dye used in the inks and also to disperse it in the polymeric resins used in the inks.

Plasticizers for elastomers and solvents for inks are often oils of natural or synthetic origin, notably mineral oils derived from petroleum distillation.

Plasticizing oils represent a large proportion of the plasticizing materials used in the field of elastomers.

The solvent used for inks is the main constituent of inks.

In the field of plasticizers and in the field of inks, oils are products that must be stored and transported in heated containers.

The transportation of these plasticizing oils or solvent oils for inks is nowadays performed by heat-insulated tanker trucks or in ISO containers allowing heating by means of a heat-transfer fluid or a steam network. The user must be equipped with storage tanks that are also kept hot until the oil is used. These constraints entail substantial energy costs and equipment costs, both for the oil supplier and for his client. In addition, maintaining the plasticizing oil or the solvents for inks at elevated temperature for a given period may affect the properties of the oil, notably the aging properties, and thus change the final performance qualities of the products into which the oil is incorporated.

It is known that organogelator agents of low molecular mass make it possible to gel liquids thermoreversibly. However, it is not possible to predict which organogelator agent is capable of gelling which liquid. In addition, the presence of an organogelator agent in a liquid has an influence on the properties of this liquid, and the aim of the invention is to formulate a plasticizing oil or a solvent oil for inks in gel form without its working properties being modified by the presence of gelling additives.

WO 2008/107551 teaches of bitumen compositions comprising an additive of organogelator type and having thermoreversible viscosity and hardness properties. It is known, notably from WO 2016/016320, to use organogelator agents for packaging bitumens which are in solid form under cold conditions and in divided form. However, the composition of a bitumen is very different from that of an oil and the intended applications are very different.

JP 2010/126635 discloses the use as lubricant composition of a base oil supplemented with a benzylidene sorbitol derivative. The compositions obtained are in the form of a gel that is capable of liquefying reversibly, by application of a shear stress, and have a consistency equal to 1 or 2 on the NLGI scale.

U.S. Pat. No. 5,186,972 discloses lubricant compositions comprising a gelling agent. When placed below a certain temperature, these compositions then pass from the liquid state to a gelled state.

The aim of the present invention is to propose an oil composition, which can be used as plasticizer or as solvent for inks, which is in divided form and is solid at ambient temperature and which can be made fluid by simple heating. In particular, one aim of the invention is to propose an oil composition, which can be used as plasticizer or as solvent, which is in divided form and is solid at ambient temperature and which can be incorporated, respectively, into an elastomer composition or into an ink. It was notably sought to develop an oil composition in solid form and in divided form comprising an organogelator agent whose presence does not significantly modify the working properties of the plasticizing oil and of the elastomer compositions into which it is incorporated, but also which does not modify the working properties of the solvent for inks and of the ink compositions into which it is incorporated.

An aim of the invention is also to propose a process for transporting and/or storing and/or handling at ambient temperature an oil which is in solid form and in divided form.

Another aim of the invention is to propose a process allowing easy handling of the oil during handling operations.

Another aim of the invention is to propose an ecological and economical process for transporting an oil and to avoid the use of additional means for maintaining this oil at elevated temperature during its transportation and/or storage and/or handling.

SUMMARY OF THE INVENTION

The invention relates to an oil composition which is solid at ambient temperature, comprising:
- 80% to 99.9% of at least one oil chosen from a hydrocarbon-based oil of petroleum or synthetic origin and mixtures thereof, preferably an oil of petroleum origin, advantageously chosen from aromatic oils and paraffinic oils,
- 0.1% to 10% of at least one organogelator additive,
- 0% to 10% of one or more other additives, the percentages being expressed by mass relative to the total mass of the composition.

According to a preferred embodiment, the hydrocarbon-based oil is chosen from hydrocarbon-based oils of petroleum origin.

According to a particular embodiment, the solid oil composition according to the invention also comprises an oil of plant origin.

According to a first preferred variant, the hydrocarbon-based oil is chosen from aromatic oils with a content of aromatic compounds of between 30% and 95% by mass, advantageously between 50% and 95% by mass, more advantageously between 60% and 95% by mass relative to the total mass of the aromatic oil.

According to a more preferred embodiment, the aromatic oil has a kinematic viscosity at 100° C. of between 0.1 and 150 mm2/s, advantageously between 5 and 120 mm2/s, more advantageously between 7 and 90 mm2/s.

According to a second preferred variant, the hydrocarbon-based oil is chosen from paraffinic oils with a total content of paraffinic compounds of at least 50% by mass relative to the total mass of the paraffinic oil.

According to a first preferred embodiment, the organogelator additive is a compound of general formula (I):

$$Ar1-R-Ar2 \qquad (I),$$

in which:
Ar1 and Ar2 represent, independently of each other, a benzene nucleus or a system of fused aromatic nuclei of from 6 to 20 carbon atoms, substituted with at least one hydroxyl group, and optionally substituted with one or more C1-C20 alkyl groups, and
R represents an optionally substituted divalent radical, the main chain of which comprises from 6 to 20 carbon atoms and at least one group chosen from amide, ester, hydrazide, urea, carbamate and anhydride functions.

According to a second preferred embodiment, the organogelator additive is a compound of general formula (II):

$$R-(NH)_nCONH-(X)_m-NHCO(NH)_n-R' \qquad (II),$$

in which:
the groups R and R', which may be identical or different, represent a saturated or unsaturated, linear, branched or cyclic hydrocarbon-based chain, comprising from 1 to 22 carbon atoms, optionally substituted with one or more hydroxyl groups or amine groups, and optionally comprising heteroatoms such as N, O, S, $C_5$-$C_{24}$ hydrocarbon-based rings and/or $C_4$-$C_{24}$ hydrocarbon-based heterocycles comprising one or more heteroatoms such as N, O, S;
the group X represents a saturated or unsaturated, linear, cyclic or branched hydrocarbon-based chain, comprising from 1 to 22 carbon atoms, which is optionally substituted, and optionally comprising heteroatoms such as N, O, S, $C_5$-$C_{24}$ hydrocarbon-based rings and/or $C_4$-$C_{24}$ hydrocarbon-based heterocycles comprising one or more heteroatoms such as N, O, S;
n and m are integers having a value of 0 or 1, independently of each other.

According to a preferred embodiment, the composition comprises from 0.2% to 5% by mass, more preferentially from 0.5% to 3.5% by mass of organogelator additive relative to the total mass of the composition.

According to a preferred embodiment, the composition is in the form of pellets or blocks.

The invention also relates to a kit comprising at least:
one oil composition which is solid at ambient temperature as described above and as detailed below, and
one capsule comprising at least one additive.

The invention also relates to a process for preparing an oil composition which is solid at ambient temperature as described above and as detailed below, comprising the following steps:
(i) providing an oil chosen from a hydrocarbon-based oil of petroleum or synthetic origin, chosen from aromatic oils, paraffinic oils and mixtures thereof, and heating it with stirring to a temperature of between 70 and 250° C., preferably between 140 and 200° C.,
(ii) adding an organogelator additive and heating with stirring to a temperature of between 70 and 250° C., preferably between 140 and 200° C.,
(iii) optionally adding one or more other additives and heating the mixture with stirring to a temperature of between 70 and 250° C., preferably between 140 and 200° C.,
(iv) shaping the composition, for example in the form of pellets or blocks,
(v) cooling to ambient temperature.

The invention also relates to a process for transporting and/or storing and/or handling an oil composition which is solid at ambient temperature and which is in divided form as described above and as detailed below, or a kit comprising such a composition, the composition being transported and/or stored and/or handled in the form of block or pellets which are solid at ambient temperature.

The invention also relates to the use of an oil composition which is solid at ambient temperature and which is in divided form as described above and as detailed below, or of a kit comprising such a composition, for the manufacture of tires.

The invention also relates to the use of an oil composition which is solid at ambient temperature and which is in divided form as described above and as detailed below, or of a kit comprising such a composition, for the formulation of an ink.

The storage, transportation and handling of oils, in particular of plasticizing oils and of solvent oils for inks, which are in solid form at ambient temperature and which are in divided form have many advantages: firstly, reduced energy costs and reduced equipment costs for the transportation and storage, secondly, transportation of these oils over longer distances, notably in geographical zones that are difficult to access, but also fewer constraints in terms of stock management and production stoppages.

DETAILED DESCRIPTION

The expression "consists essentially of" followed by one or more features means that, besides the components or steps explicitly listed, components or steps which do not significantly modify the properties and features of the invention may be included in the process or the material of the invention.

The expression "between X and Y" includes the limits, unless explicitly mentioned otherwise. This expression thus means that the targeted range comprises the values X, Y and all the values ranging from X to Y.

The term "oil composition which is solid at ambient temperature" means a composition having a solid appearance at ambient temperature under transportation and/or storage and/or handling conditions. More precisely, this means a solid oily composition which conserves its solid appearance throughout the transportation and/or storage and/or handling at ambient temperature, i.e. a solid oil which does not undergo creep at a temperature ranging up to 80° C., advantageously from 5° C. to 70° C., preferably from 10° C. to 70° C., more preferentially from 10° C. to 60° C., even more preferentially from 15° C. to 50° C., and at pressure forces derived from the transportation and/or storage and/or handling conditions.

The term "oil composition which is solid under cold conditions and which is in divided form" means a composition which is solid at ambient temperature and which is packaged in a divided form, i.e. in the form of units that are separate from each other, which are referred to as pellets or blocks.

The oily composition according to the invention is also equivalently denoted in the present description as a "solid oily composition" or a "solid oil".

The oily composition according to the invention is denoted equivalently in the present description as "oily composition which is solid under cold conditions and which is in divided form" or "supplemented oily composition".

The term "penetrability" means here the measurement of the penetrability of solid oils with a cone, which is performed according to the standard ASTM D217 at 25° C. This penetrability characteristic is expressed in tenths of a millimeter (dmm or 1/10 mm). The cone penetrability, measured at 25° C., according to the standardized test ASTM D217, represents the measurement of the penetration into a sample of solid oil, after a time of 5 seconds, of a cone with a pointed end, of normalized mass, placed without constraints on the surface of a container comprising at least 0.4 kg of solidified oil. This operation is performed three times and the measurement of the penetrability of the solidified oil results from the mean of these three measurements.

The solid oils according to the invention may also be characterized by their consistency. This consistency characteristic is measured according to the standard ASTM D4950 and is expressed on the NLGI (National Lubricating Grease Institute index) scale. The penetrability and the consistency of an oil are two associated parameters, the correspondence of which is given in the table below:

| Penetrability (ASTM D 217) | NLGI index (ASTM D4950) |
|---|---|
| 85-115 1/10 mm | 6 |
| 130-160 1/10 mm | 5 |
| 185-205 1/10 mm | 4 |
| 220-250 1/10 mm | 3 |
| 265-295 1/10 mm | 2 |
| 310-340 1/10 mm | 1 |
| 355-385 1/10 mm | 0 |
| 400-430 1/10 mm | 00 |
| 445-475 1/10 mm | 000 |

Preferably, the solid oil composition according to the invention has a penetrability at 25° C., measured according to the standard ASTM D217, ranging from 50 to 160 1/10 mm, preferably from 55 to 150 1/10 mm, even more preferentially ranging from 65 to 135 1/10 mm.

Oil

The oil may be of any type, and is chosen as a function of the intended subsequent application. It may be a hydrocarbon-based oil of petroleum origin, a hydrocarbon-based oil of synthetic origin, or a mixture thereof.

Preferably, the oil is a hydrocarbon-based oil of petroleum origin. It may be of aromatic or paraffinic type.

According to one embodiment, the oil is composed of from 90% to 100% by mass of at least one hydrocarbon-based oil of petroleum origin, advantageously from 95% to 100%, better still from 98% to 100%, by mass of at least one hydrocarbon-based oil of petroleum origin. Even more advantageously, the oil is constituted of a hydrocarbon-based oil of petroleum origin or of a mixture of hydrocarbon-based oils of petroleum origin.

In a first embodiment of the invention, the hydrocarbon-based oil of petroleum origin is chosen from aromatic oils.

More preferentially, the aromatic oils have a content of aromatic compounds of between 30% and 95% by mass, advantageously between 50% and 95% by mass, more advantageously between 60% and 95% by mass relative to the total mass of the aromatic oil (SARA: saturates/aromatics/resins/asphaltenes method).

More preferentially, the aromatic oils have a content of saturated compounds of between 1% and 20% by mass, advantageously between 3% and 15% by mass, more advantageously between 5% and 10% by mass (SARA: saturates/aromatics/resins/asphaltenes method).

More preferentially, the aromatic oils have a content of resinous compounds of between 1% and 10% by mass, advantageously between 3% and 5% by mass (SARA: saturates/aromatics/resins/asphaltenes method).

The contents of saturated, resinous and aromatic compounds mentioned in the present patent application are determined according to the standard ASTM D2140, as mass percentages relative to the mass of the oil.

More preferentially, the aromatic oils have a kinematic viscosity at 100° C. of between 0.1 and 150 mm2/s, advantageously between 5 and 120 mm2/s, more advantageously between 7 and 90 mm2/s (method: ASTM D445).

More preferentially, the aromatic oils have a kinematic viscosity at 40° C. of between 100 and 10 000 mm2/s, advantageously between 200 and 7500 mm2/s, more advantageously between 250 and 6000 mm2/s (method: ASTM D445).

More preferentially, the aromatic oils have a Cleveland flashpoint of greater than or equal to 150° C., advantageously between 150° C. and 600° C., more advantageously between 200° C. and 400° C. (method: EN ISO 2592).

More preferentially, the aromatic oils have an aniline point of between 20° C. and 120° C., advantageously between 40° C. and 120° C. (method: ASTM D611).

More preferentially, the aromatic oils have a mass per unit volume at 15° C. of between 400 kg/m3 and 1500 kg/m3, advantageously between 600 kg/m3 and 1200 kg/m3, more advantageously between 800 kg/m3 and 1000 kg/m3 (method: ASTM D4052).

According to this advantageous embodiment, the aromatic oil comprises aromatic extracts of petroleum residues, obtained by extraction or dearomatization of petroleum fraction distillation residues.

The aromatic extracts are byproducts of the crude oil refinery process, obtained notably from the vacuum distillation products of the atmospheric residues.

They result from a single or a double extraction of the upgradable raffinate in lubricants, by means of a polar solvent. The various extracts are classified in different categories as a function of the process for obtaining them and are as follows:

DAE (distillate aromatic extract),
MES (mild extract solvate),
TDAE (treated distillate aromatic extract),
RAE (residual aromatic extract),
TRAE (treated residual aromatic extract).

For example, the aromatic oils that may be used according to the invention may be chosen from the following products sold by the company Total under the names: Plaxolene 50® (also known under the name Scriptane NW 50®), Plaxolene TD346® and Plaxolene MS132®.

The respective contents of paraffinic, naphthenic and aromatic compounds depend to a certain extent on the nature of the crude oil that is the origin of the aromatic oil and on the refining process used.

For example, Plaxolene 50® or Scriptane NW 50® is an RAE (residual aromatic extract) which has:
  a mass per unit volume at 15° C. of between 980 kg/m$^3$ and 1010 kg/m$^3$ (method: ASTM D4052),
  a flashpoint (Cleveland) of about 230° C. (method: EN ISO 2592),
  a kinematic viscosity at 100° C. of between 60 and 85 mm$^2$/s (method: ASTM D445),
  an aniline point of between 53 and 65° C. (method: ASTM D611).

For example, Plaxolene TD346® is a TDAE (treated distillates aromatic extract) which has:

a mass per unit volume at 15° C. of between 940 kg/m³ and 970 kg/m³ (method: ASTM D4052), a flashpoint (Cleveland) of about 220° C. (method: EN ISO 2592), a kinematic viscosity at 100° C. of between 16 and 23 mm²/s (method: ASTM D445), an aniline point of between 64 and 72° C. (method: ASTM D611).

For example, Plaxolene MS132® is an MES (mild extract solvate) which has:

a mass per unit volume at 15° C. of between 895 kg/m³ and 925 kg/m³ (method: ASTM D4052), a flashpoint (Cleveland) of about 230° C. (method: EN ISO 2592), a kinematic viscosity at 100° C. of between 13 and 17 mm²/s (method: ASTM D445), an aniline point of between 85 and 100° C. (method: ASTM D611).

According to a second advantageous embodiment, the oil is a paraffinic oil predominantly comprising paraffinic extracts of petroleum residues. According to this specific embodiment, advantageously, the oil comprises a total content of paraffinic compounds of at least 50% by mass, preferably of at least 60% by mass, for example between 50% and 90%, preferably between 60% and 90%, more preferentially between 50% and 80% and in particular between 55% and 75% or in particular between 60% and 75%.

In a more specific embodiment, the oil also contains a total content of naphthenic compounds which does not exceed 25%, for example between 5% and 25%, and in particular between 10% and 25%.

In a more specific embodiment, the oil also contains a total content of aromatic compounds which does not exceed 25%, for example between 5% and 25%, and in particular between 8% and 18%.

In a particularly preferred embodiment, the oil is a paraffinic oil, comprising the respective contents:
(i) a total content of paraffinic compounds of between 50% and 90%;
(ii) a total content of naphthenic compounds of between 5% and 25%; and
(iii) a total content of aromatic compounds of between 5% and 25%.

In a more particularly preferred embodiment, the oil is a paraffinic oil, comprising the respective contents:
(i) a total content of paraffinic compounds of between 60% and 75%;
(ii) a total content of naphthenic compounds of between 5% and 25%; and
(iii) a total content of aromatic compounds of between 5% and 25%.

In a more preferred embodiment, the oil is a paraffinic oil, comprising the respective contents:
(i) a total content of paraffinic compounds of between 60% and 75%;
(ii) a total content of naphthenic compounds of between 15% and 25%; and
(iii) a total content of aromatic compounds of between 10% and 15%.

In a preferred embodiment of the invention, the paraffinic oils are derived from deasphalting fractions from distillation under reduced pressure (vacuum residue, VR) of crude oil (referred to hereinbelow as "DAO oil"). The principle of deasphalting is based on a separation by precipitation of a petroleum residue into two phases: i) a "deasphalted oil" phase, also known as "oil matrix" or "oil phase" or DAO (deasphalted oil); and ii) an "asphalt" phase. Oils corresponding to the characteristics below, and which may be used according to the invention, are obtained via the processes of deasphalting of vacuum residues (VRs) derived from petroleum refinery, for example via deasphalting using a C3 to C6 solvent, preferably with propane. Deasphalting processes are well known to those skilled in the art and are described, for example, in FR 3014111, US 2004/0069685, U.S. Pat. Nos. 4,305,812 and 4,455,216 or in Lee et al., 2014, Fuel Processing Technology 119: 204-210.

In Lee et al., 2014, Fuel Processing Technology 119: 204-210, the residues derived from vacuum distillation (VR) are separated according to their molecular mass in the presence of $C_3$ to $C_6$ solvent (for example propane). The "DAO" oil thus obtained is rich in paraffin, has a very low content of asphaltenes, an evaporation temperature of between 440° C. and 750° C. and an API gravity which is much higher than that of the vacuum residues.

The API (American Petroleum Institute) gravity or the API density of an oil may be obtained from formula (1) below:

$$G_{API} = \frac{141.5}{d} - 131.5$$

with:

$G_{API}$, the API gravity of the oil under consideration (expressed without units), and d, the density at 16° C. (60° F.) of the oil under consideration (expressed without units), taking water as reference.

The respective contents of paraffinic, naphthenic and aromatic compounds depend to a certain extent on the nature of the crude oil which is the origin of the DAO oil and on the refining process used. A person skilled in the art knows how to determine the respective contents of paraffinic, naphthenic and aromatic compounds of a DAO oil, for example by means of the SARA fractionation method also described in Lee et al., 2014, Fuel Processing Technology 119: 204-210 and thus to select the DAO oil that is appropriate for the preparation of the gelled oil composition according to the invention.

The contents of paraffinic, naphthenic and aromatic compounds mentioned in the present patent application are determined according to the standard ASTM D2140, as mass percentages relative to the mass of the oil.

In a third embodiment of the invention, the hydrocarbon-based oil of petroleum origin is a mixture of aromatic oils as described above and of paraffinic oils as described above.

According to another embodiment, the oily composition may also comprise an oil of plant origin.

For example, the oils of plant origin may be chosen from rapeseed, sunflower, soybean, linseed, olive, palm, castor, wood, corn, marrow, grapeseed, jojoba, sesame, walnut, hazelnut, almond, shea, macadamia, cotton, alfalfa, rye, safflower, groundnut, coconut and coconut kernel oils, and mixtures thereof.

Preferentially, the oil of petroleum origin represents at least 80% by mass of the oil present in the solid oil compositions, preferably at least 90% by mass, even more preferentially at least 95% by mass, and advantageously at least 99% by mass.

The Organogelator Additive

The oil composition which is solid at ambient temperature and which is in divided form according to the invention comprises at least one chemical additive chosen from organogelator additives.

In particular, the oil composition which is solid at ambient temperature and which is in divided form comprises at least one organogelator chemical additive in a suitable amount so that this composition is solid at ambient temperature and is in divided form.

In one embodiment of the invention, the organogelator chemical additive is an organic compound. Advantageously, the organogelator additive has a molar mass of less than or equal to 2000 g·mol$^{-1}$, preferably a molar mass of less than or equal to 1000 g·mol$^{-1}$.

In this first embodiment, according to a first variant, the organogelator additive is a compound of general formula (I):

$$\text{Ar1-R—Ar2} \qquad (I),$$

in which:
Ar1 and Ar2 represent, independently of each other, a benzene nucleus or a system of fused aromatic nuclei of from 6 to 20 carbon atoms, substituted with at least one hydroxyl group and optionally substituted with one or more $C_1$-$C_{20}$ alkyl groups, and
R represents an optionally substituted divalent radical, the main chain of which comprises from 6 to 20 carbon atoms and at least one group chosen from amide, ester, hydrazide, urea, carbamate and anhydride functions.

Preferably, Ar1 and/or Ar2 are substituted with at least one alkyl group of 1 to carbon atoms, advantageously in one or more ortho positions relative to the hydroxyl group(s); more preferentially, Ar1 and Ar2 are 3,5-dialkyl-4-hydroxyphenyl groups, advantageously 3,5-di-tert-butyl-4-hydroxyphenyl groups.

Preferably, R is in the para position relative to a hydroxyl group of Ar1 and/or Ar2.

An example of a compound of formula (I) that may be mentioned is 2',3-bis[(3-[3,5-di-tert-butyl-4-hydroxyphenyl]propionyl)]propionohydrazide.

According to a second variant of this first embodiment, the organogelator additive is a compound of general formula (II):

in which:
the groups R and R', which may be identical or different, represent a saturated or unsaturated, linear, branched or cyclic hydrocarbon-based chain, comprising from 1 to 22 carbon atoms, optionally substituted with one or more hydroxyl groups or amine groups, and optionally comprising heteroatoms such as N, O, S, $C_5$-$C_{24}$ hydrocarbon-based rings, and/or $C_4$-$C_{24}$ hydrocarbon-based heterocycles comprising one or more heteroatoms such as N, O, S;
the group X represents a saturated or unsaturated, linear, cyclic or branched hydrocarbon-based chain, comprising from 1 to 22 carbon atoms, which is optionally substituted, and optionally comprising heteroatoms such as N, O, S, $C_5$-$C_{24}$ hydrocarbon-based rings, and/or $C_4$-$C_{24}$ hydrocarbon-based heterocycles comprising one or more heteroatoms such as N, O, S;
n and m are integers having a value of 0 or 1, independently of each other.

According to this variant, when the integer m has a value of 0, then the groups R—(NH)$_n$CONH and NHCO(NH)$_n$—R' are covalently bonded and together form a hydrazide bond CONH—NHCO. The group R, or the group R', then represents at least one group chosen from: a hydrocarbon-based chain of at least 4 carbon atoms, an aliphatic ring of 3 to 8 atoms, an aliphatic, partially aromatic or fully aromatic fused polycyclic system, each ring comprising 5 or 6 atoms.

Still according to this variant, when the integer m has a value of 1, then the group R, the group R' and/or the group X represent at least one group chosen from: a hydrocarbon-based chain of at least 4 carbon atoms, an aliphatic ring of 3 to 8 atoms, an aliphatic, partially aromatic or fully aromatic fused polycyclic system, each ring comprising 5 or 6 atoms.

Preferably, the group R and/or R' represent an aliphatic hydrocarbon-based chain of 4 to 22 carbon atoms, chosen notably from the groups $C_4H_9$, $C_5H_{11}$, $C_9H_{19}$, $C_{11}H_{23}$, $O_{12}H_{25}$, $O_{17}H_{35}$, $O_{18}H_{37}$, $O_{21}H_{43}$, $O_{22}H_{45}$.

According to a first preferred embodiment, the group X represents a saturated linear hydrocarbon-based chain comprising from 1 to 22 carbon atoms, advantageously from 1 to 12 carbon atoms, better still from 1 to 10 carbon atoms. Preferably, the group X is chosen from the groups $C_2H_4$, $O_3H_6$.

According to a second preferred embodiment, the group X may also be a cyclohexyl group or a phenyl group, the radicals R—(NH)$_n$CONH— and —NHCO(NH)$_n$—R' may then be in the ortho, meta or para position. Moreover, the radicals R—(NH)$_n$CONH— and —NHCO(NH)$_n$—R' may be in the cis or trans position relative to each other. Furthermore, when the radical X is cyclic, this ring may be substituted with groups other than the two main groups R—(NH)$_n$CONH— and —NHCO(NH)$_n$—R'.

According to a third preferred embodiment, the group X represents two optionally substituted rings of 6 carbons, linked via a $CH_2$ group, these rings being aliphatic or aromatic. In this case, the group X is, for example:

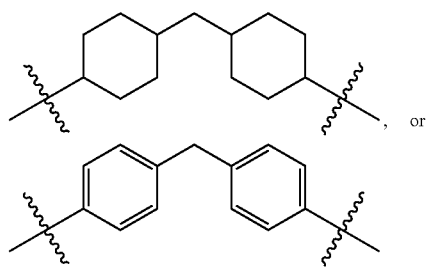

Advantageously, according to this variant, the organogelator additive is a compound of general formula (II) chosen from hydrazide derivatives such as the compounds $C_5H_{11}$—CONH—NHCO—$C_5H_{11}$, $C_9H_{19}$—CONH—NHCO—$C_9H_{19}$, $C_{11}H_{23}$—CONH—NHCO—$C_{11}H_{23}$, $C_{17}H_{35}$—CONH—NHCO—$C_{17}H_{35}$, or $C_{21}H_{43}$—CONH—NHCO—$C_{21}H_{43}$; diamides such as N,N'-ethylenedi(laurylamide) of formula $C_{11}H_{23}$—CONH—$CH_2$—$CH_2$—NHCO—$C_{11}H_{31}$, N,N'-ethylenedi(myristylamide) of formula $C_{13}H_{27}$—CONH—$CH_2$—$CH_2$—NHCO—$C_{13}H_{27}$, N,N'-ethylenedi(palmitamide) of formula $C_{15}H_{31}$—CONH—$CH_2$—$CH_2$—NHCO—$C_{15}H_{31}$, N,N'-ethylenedi(stearamide) of formula $C_{17}H_{35}$—CONH—$CH_2$—$CH_2$—NHCO—$C_{17}H_{35}$; and ureide derivatives such as 4,4'-bis(dodecylaminocarbonylamino)diphenylmethane of formula $C_{12}H_{25}$—NHCONH—$C_6H_4$—$CH_2$—$C_6H_4$—NHCONH—$C_{12}H_{25}$.

According to a third variant, the organogelator additive is a compound of formula (III):

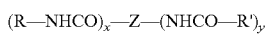

in which:
R and R', which may be identical or different, represent a saturated or unsaturated, linear, branched or cyclic hydrocarbon-based chain comprising from 1 to 22 carbon atoms, which is optionally substituted, and optionally comprising heteroatoms such as N, O, S, $C_5$-$C_{24}$ hydrocarbon-based rings and/or $C_4$-$C_{24}$ hydrocarbon-based heterocycles comprising one or more heteroatoms such as N, O, S, Z represents a trifunctionalized group chosen from the following groups:

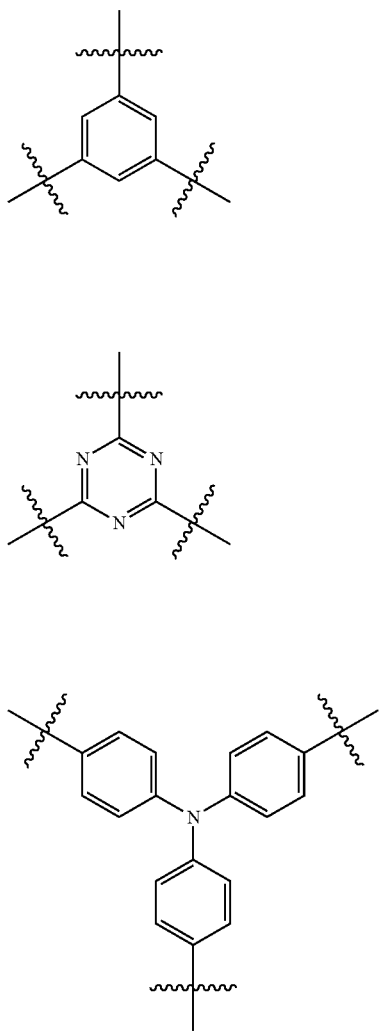

x and y are different integers, having a value ranging from 0 to 3 and such that x+y=3.

Preferably, when x is equal to 0 and Z represents $Z_2$, the compound of formula (III) is N2,N4,N6-tridecylmelamine having the following formula with R' representing the $C_9H_{19}$ group:

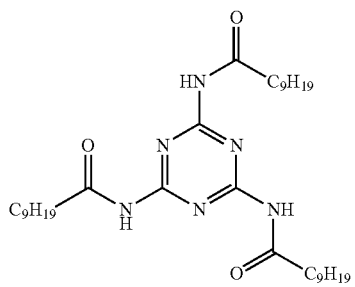

Other preferred compounds corresponding to formula (III) are such that x is equal to 0, Z represents $Z_2$ and R' represents a saturated linear hydrocarbon-based chain of 1 to 22 carbon atoms, preferably of 2 to 18 carbon atoms, preferably of 5 to 12 carbon atoms.

Other preferred compounds corresponding to formula (III) are such that: y is equal to 0 and Z represents $Z_1$, the compounds then have the formula:

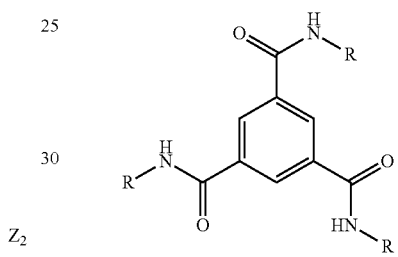

with R chosen from the following groups, taken alone or as mixtures:

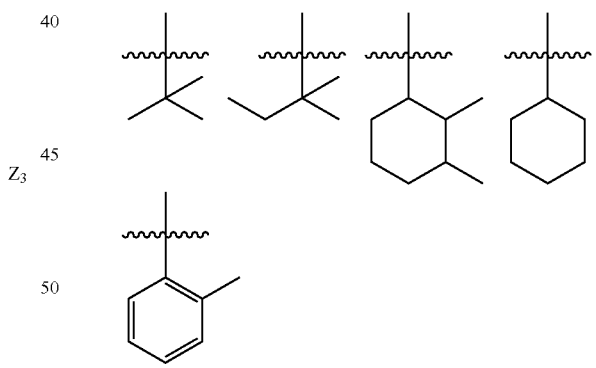

Other preferred compounds corresponding to formula (III) are such that: y is equal to 0, Z represents $Z_1$ and R represents a saturated linear hydrocarbon-based chain of 1 to 22 carbon atoms, preferably of 8 to 12 carbon atoms.

According to a fourth variant, the organogelator additive is a product of reaction of at least one $O_3$—$O_{12}$ polyol and of at least one $O_2$—$O_{12}$ aldehyde. Among the polyols that may be used, mention may be made of sorbitol, xylitol, mannitol and/or ribitol. Preferably, the polyol is sorbitol.

Advantageously, according to this variant, the organogelator additive is a compound which comprises at least one function of general formula (IV):

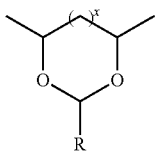
(IV)

with:
x is an integer,
R is chosen from a $C_1$-$C_{12}$ alkyl, $C_2$-$C_{12}$ alkenyl, $C_6$-$C_{12}$ aryl or $C_7$-$C_{12}$ aralkyl radical, optionally substituted with one or more halogen atoms, one or more $C_1$-$C_6$ alkoxy groups.

According to this variant, the organogelator additive is advantageously a sorbitol derivative. The term "sorbitol derivative" means any reaction product obtained from sorbitol, in particular any reaction product obtained by reacting an aldehyde with D-sorbitol. This condensation reaction gives sorbitol acetals, which are sorbitol derivatives. 1,3:2,4-Di-O-benzylidene-D-sorbitol is obtained by reacting 1 mol of D-sorbitol and 2 mol of benzaldehyde and has the formula:

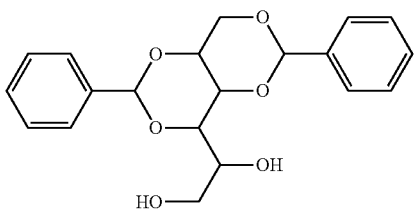 [SMILES: OCC(O)C1OC(c2ccccc2)OC2COC(c3ccccc3)OC21]

The sorbitol derivatives may thus be all aldehyde condensation products, notably of aromatic aldehydes, with sorbitol. Sorbitol derivatives having the following general formula will then be obtained:

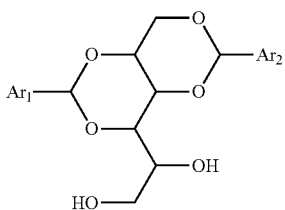

in which $Ar_1$ and $Ar_2$ are optionally substituted aromatic nuclei.

Among the sorbitol derivatives, other than 1,3:2,4-di-O-benzylidene-D-sorbitol, there may be, for example, 1,3:2,4:5,6-tri-O-benzylidene-D-sorbitol, 2,4-mono-O-benzylidene-D-sorbitol, 1,3:2,4-bis(p-methylbenzylidene)sorbitol, 1,3:2,4-bis(3,4-dimethylbenzylidene)sorbitol, 1,3:2,4-bis(p-ethylbenzylidene)sorbitol, 1,3:2,4-bis(p-propylbenzylidene)sorbitol, 1,3:2,4-bis(p-butylbenzylidene)sorbitol, 1,3:2,4-bis(p-ethoxylbenzylidene)sorbitol, 1,3:2,4-bis(p-chlorobenzylidene)sorbitol, 1,3:2,4-bis(p-bromobenzylidene)sorbitol, 1,3:2,4-di-O-methylbenzylidene-D-sorbitol, 1,3:2,4-di-O-dimethylbenzylidene-D-sorbitol, 1,3:2,4-di-O-(4-methylbenzylidene)-D-sorbitol, 1,3:2,4-di-O-(4,3-dimethylbenzylidene)-D-sorbitol. Preferably, according to this variant, the organogelator additive is 1,3:2,4-di-O-benzylidene-D-sorbitol.

According to a fifth variant, the organogelator additive is a compound of general formula (V):

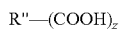

$$R''\text{---}(COOH)_z \quad (V),$$

in which R'' represents a linear or branched, saturated or unsaturated chain comprising from 4 to 68 carbon atoms, preferably from 4 to 54 carbon atoms, more preferentially from 4 to 36 carbon atoms and z is an integer ranging from 2 to 4. Preferably, the group R'' is a saturated linear chain of formula $C_wH_{2w}$ with w being an integer ranging from 4 to 22, preferably from 4 to 12.

According to this variant of the invention, the organogelator additives corresponding to formula (V) may be diacids (z=2), triacids (z=3) or tetracids (z=4). The organogelator additives that are preferred according to this variant are diacids with z=2. Preferably, according to this variant, the diacids (V) have the general formula HOOC—$C_wH_{2w}$—COOH with w being an integer ranging from 4 to 22, preferably from 4 to 12.

Advantageously, according to this variant, the organogelator additive is a diacid chosen from adipic acid or 1,6-hexanedioic acid with w=4, pimelic acid or 1,7-heptanedioic acid with w=5, suberic acid or 1,8-octanedioic acid with w=6, azelaic acid or 1,9-nonanedioic acid with w=7, sebacic acid or 1,10-decanedioic acid with w=8, undecanedioic acid with w=9, 1,2-dodecanedioic acid with w=10 or tetradecanedioic acid with w=12.

More advantageously, the organogelator additive is sebacic acid or 1,10-decanedioic acid with w=8.

The diacids may also be diacid dimers of unsaturated fatty acid(s), i.e. dimers formed from at least one unsaturated fatty acid, for example from a single unsaturated fatty acid or from two different unsaturated fatty acids. The diacid dimers of unsaturated fatty acid(s) are conventionally obtained by intermolecular dimerization reaction of at least one unsaturated fatty acid (for example Diels-Alder reaction).

Preferably, only one type of unsaturated fatty acid is dimerized. They are derived in particular from the dimerization of an unsaturated fatty acid which is notably of $C_8$ to $C_{34}$, notably of $C_{12}$ to $C_{22}$, in particular of $C_{16}$ to $C_{20}$ and more particularly of $C_{18}$. A preferred fatty acid dimer is obtained by dimerization of linoleic acid, said dimer then possibly being partially or totally hydrogenated.

Another preferred fatty acid dimer has the formula HOOC—$(CH_2)_7$—CH=CH—$(CH_2)_7$—COOH. Another preferred fatty acid dimer is obtained by dimerization of methyl linoleate. Similarly, fatty acid triacids and fatty acid tetracids may be found, which are obtained, respectively, by trimerization and tetramerization of at least one fatty acid.

According to a sixth variant, the organogelator additive is a compound of general formula (VI):

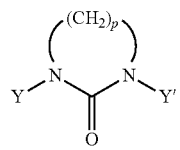

in which:
the groups Y and Y' represent, independently of each other, an atom or group chosen from: H, —$(CH_2)_q$-$CH_3$, —$(CH_2)_q$-$NH_2$, —$(CH_2)_q$-OH, —$(CH_2)_q$-COOH or

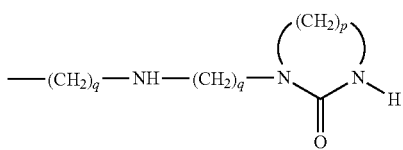

with q being an integer ranging from 2 to 18, preferably from 2 to 10, preferably from 2 to 4 and p being an integer greater than or equal to 2, preferably having a value of 2 or 3.

Among the preferred organogelator additives corresponding to formula (VI), mention may be made of the following compounds:

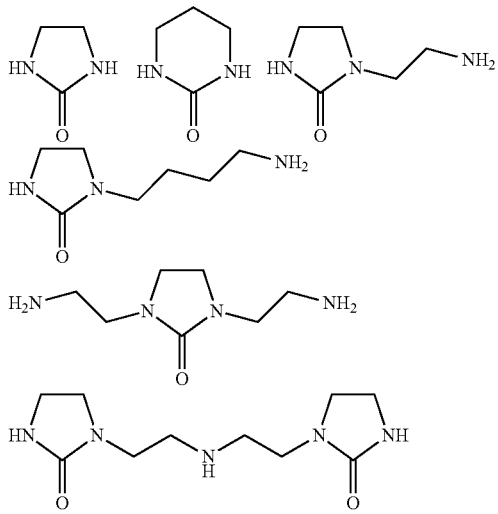

Preferably, according to this variant, the organogelator additive of general formula (VI) is:

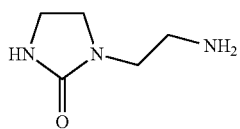

According to a seventh variant of this embodiment, the organogelator additive is a compound of general formula (VII):

in which R and R', which may be identical or different, represent a saturated or unsaturated, linear, branched or cyclic hydrocarbon-based chain, comprising from 1 to 22 carbon atoms, preferably from 8 to 12 carbon atoms, which is optionally substituted, and optionally comprising heteroatoms, such as N, O, S, $C_5$-$C_{24}$ hydrocarbon-based rings and/or $C_4$-$C_{24}$ hydrocarbon-based heterocycles comprising one or more heteroatoms such as N, O, S.

It would not constitute a departure from the context of the invention to combine several different chemical additives such as different organogelator additives of formulae (I), (II), (III), (V), (VI) and (VII), the products of reaction of at least one $C_3$-$C_{12}$ polyol and of at least one $C_2$—$O_{12}$ aldehyde, notably those comprising a group of formula (IV), in the oil composition.

Advantageously, the oil composition comprises at least one organogelator additive chosen from the compounds of formula (I), the compounds of formula (II) and the compounds of formula (V).

More advantageously, the oil composition comprises at least one organogelator additive chosen from the compounds of formula (I) or the compounds of formula (II).

Preferably, the oil composition comprises an organogelator additive in which the additive is 2',3-bis[(3-[3,5-di-tert-butyl-4-hydroxyphenyl]propionyl)]propiono hydrazide.

According to an advantageous embodiment, the oil composition according to the invention comprises at least two organogelator additives.

According to a first variant of this embodiment, the oil composition according to the invention comprises at least one first organogelator additive of formula (V) and at least one second organogelator additive chosen from: the organogelator additives of formula (I); the organogelator additives of formula (II); the organogelator additives of formula (III); the organogelator additives of formula (V); the organogelator additives of formula (VI); the organogelator additives of formula (VII) and the products of reaction of at least one $C_3$—$O_{12}$ polyol and of at least one $C_2$—$O_{12}$ aldehyde, notably those comprising a group of formula (IV), the second organogelator additive being different from the first organogelator additive.

Preferably, and according to this first variant, the oil composition according to the invention comprises at least one first organogelator additive of formula (V) and at least one second organogelator additive chosen from: the organogelator additives of formula (I) and the organogelator additives of formula (II).

According to a second variant of this embodiment, the oil composition according to the invention comprises at least one first organogelator additive of formula (II) and at least one second organogelator additive chosen from: the organogelator additives of formula (I); the organogelator additives of formula (II); the organogelator additives of formula (III); the organogelator additives of formula (V); the organogelator additives of formula (VI); the organogelator additives of formula (VII) and the products of reaction of at least one $C_3$—$O_{12}$ polyol and of at least one $C_2$—$O_{12}$ aldehyde, notably those comprising a group of formula (IV), the second organogelator additive being different from the first organogelator additive.

According to a third variant of this embodiment, the oil composition according to the invention comprises at least one first organogelator additive of formula (I) and at least one second organogelator additive chosen from: the organogelator additives of formula (I); the organogelator additives of formula (II); the organogelator additives of formula (III); the organogelator additives of formula (V); the organogelator additives of formula (VI); the chemical additives of formula (VII) and the products of reaction of at least one $O_3$—$O_{12}$ polyol and of at least one $O_2$—$O_{12}$ aldehyde, notably those comprising a group of formula (IV), the second organogelator additive being different from the first organogelator additive.

Preferably, and according to this third variant, the second organogelator additive is chosen from the organogelator additives of formula (II) and the organogelator additives of formula (V).

Advantageously, the oil composition comprises from 0.1% to 10% by mass, preferably from 0.2% to 5% by mass, more preferentially from 0.5% to 3.5% by mass of organogelator chemical additive relative to the total mass of the composition.

Oil Composition which is Solid at Ambient Temperature and which is in Divided Form The oil composition is solid at ambient temperature and is in divided form. It comprises the oil, the organogelator additive(s) and, where appropriate, other additives. Advantageously, the oil composition comprises, or is essentially composed of:
- 80% to 99.9% by mass of at least one oil chosen from: hydrocarbon-based oils of petroleum or synthetic origin, preferably of petroleum origin, advantageously chosen from aromatic oils and paraffinic oils,
- 0.1% to 10% by mass of at least one organogelator chemical additive,
- 0% to 10% by mass of one or more other additives, relative to the total mass of the composition.

Preferably, the oil composition comprises, or is essentially composed of:
- 85% to 99.8% by mass of at least one oil chosen from: hydrocarbon-based oils of petroleum or synthetic origin, preferably of petroleum origin, advantageously chosen from aromatic oils and paraffinic oils,
- 0.2% to 5% by mass of at least one organogelator chemical additive,
- 0% to 10% by mass of one or more other additives, relative to the total mass of the composition.

More preferentially, the oil composition comprises, or is essentially composed of:
- 86.5% to 99.5% by mass of at least one oil chosen from: hydrocarbon-based oils of petroleum or synthetic origin, preferably of petroleum origin, advantageously chosen from aromatic oils and paraffinic oils,
- 0.5% to 3.5% by mass of at least one organogelator chemical additive,
- 0% to 10% by mass of one or more other additives relative to the total mass of the composition.

According to a first preferred embodiment, the organogelator additive is chosen from those corresponding to formula (I), notably 2',3-bis[(3-[3,5-di-tert-butyl-4-hydroxyphenyl]propionyl)]propionohydrazide.

Advantageously, according to this embodiment, the oil composition comprises, or is essentially composed of:
- 85% to 99.9% by mass of at least one hydrocarbon-based oil of petroleum origin, preferably of petroleum origin, advantageously chosen from aromatic oils and paraffinic oils,
- 0.1% to 5% by mass of at least one organogelator chemical additive of formula (I), advantageously 2',3-bis[(3-[3,5-di-tert-butyl-4-hydroxyphenyl]propionyl)]propionohydrazide,
- 0% to 10% by mass of one or more other additives, relative to the total mass of the composition.

Preferably, the oil composition comprises, or is essentially composed of:
- 86.5% to 99.8% by mass of at least one hydrocarbon-based oil of petroleum origin, preferably of petroleum origin, advantageously chosen from aromatic oils and paraffinic oils,
- 0.2% to 3.5% by mass of at least one organogelator chemical additive of formula (I), advantageously 2',3-bis[(3-[3,5-di-tert-butyl-4-hydroxyphenyl]propionyl)]propionohydrazide,
- 0% to 10% by mass of one or more other additives, relative to the total mass of the composition.

Other Additives

According to one variant of the invention, it may be envisaged to incorporate into the oil composition additives of all kinds usually used for the formulation, as a function of the intended application, provided that these additives do not hamper the gelation.

The amount of additive in the oil composition is calculated as a function of the amount of oil that will be used for the intended application and of the amount of additive expected in this application. Usually, the additives are incorporated in amounts ranging from 0.1% to 10% by mass relative to the total mass of the oil composition.

Application for Tire Manufacture

The oily composition according to the invention may also comprise one or more additives included in the formulation of elastomer compositions, in particular of rubber. It may be envisaged to add to the plasticizing oil composition pigments, dyes, vulcanization agents, vulcanization retardants, silica, fatty acids, for instance stearic acid, silanes, carbon black, etc.

According to one embodiment of the invention, the oil composition also comprises at least one compound chosen from transition metal oxides, such as magnesium, calcium, cadmium, lead, cobalt or zinc oxides, notably zinc oxide ZnO.

Zinc oxide is commonly used for catalyzing the vulcanization of rubber.

Application for the Manufacture of Inks 25 [00135] The oily composition according to the invention may also comprise one or more additives included in the formulation of inks, for instance surfactants, fillers, stabilizers, siccative or semi-siccative oils, rheology improvers, antioxidant additives, drying accelerators, antiabrasion agents, gelling agents, etc.

As examples of siccative or semi-siccative oils, mention may be made of linseed oil, tung oil and safflower oil.

Preferentially, the oily composition according to the invention is used in the manufacture of printing inks, notably inks for printing in plate form (or offset printing) which is divided into three types: heat-set inks, inks for sheet-fed machines, cold-set inks (newspaper inks).

Process for Preparing the Solid Oil Composition

The oil compositions that are solid at ambient temperature according to the invention may be prepared, for example, according to the following process comprising the steps of:
(i) providing an oil, for example the DAO or RAE oil, and heating it with stirring at a temperature of between 70 and 250° C., preferably between 140 and 200° C., for example for 10 minutes to 30 minutes,
(ii) adding an organogelator additive and heating with stirring at a temperature of between 70 and 250° C., preferably between 140 and 200° C., for example for 30 minutes to 2 hours,
(iii) optionally adding one or more other additives and heating with stirring at a temperature of between 70 and 250° C., preferably between 140 and 200° C., for example for 5 minutes to 20 minutes,
(iv) shaping the composition, for example in the form of pellets or blocks,
(v) cooling to ambient temperature.

The order of steps (i) to (iii) may be modified.

Pellets of Oil that is Solid at Ambient Temperature

For the purposes of the invention, the term "oil pellets" may also be defined as an oil that is solid at ambient temperature, packaged in a divided form, i.e. in the form of small-sized units known as balls, pellets or particles.

The oil pellets according to the invention are obtained by shaping an oil composition as described above according to any known process, for example according to the manufacturing process described in U.S. Pat. No. 3,026,568, WO 2009/153324 or WO 2012/168380. According to a particular embodiment, the shaping of the pellets may be performed by draining, in particular with the aid of a drum.

Other techniques may be used in the process for manufacturing the pellets of oil that is solid at ambient temperature according to the invention, in particular molding, extrusion, etc.

Preferably, the oil pellets according to the invention may have, within the same population of pellets, one or more shapes chosen from a cylindrical, spherical or ovoid form. The size of the oil pellets according to the invention is such that the longest mean dimension is preferably less than or equal to 50 mm, more preferentially from 3 to 30 mm, even more preferentially from 5 to 20 mm. The size and shape of the pellets of oil that is solid at ambient temperature may vary according to the manufacturing process employed. For example, the use of a die makes it possible to control the manufacture of pellets of a chosen size. Screening makes it possible to select pellets as a function of their size.

The oil pellets are preferably transported and/or stored in bulk in 1 kg to 30 kg or 500 kg to 1000 kg bags commonly known as big bags, said bags preferably being made of hot-melt material, or in 5 kg to 30 kg cartons or in 100 kg to 200 kg drums.

According to one embodiment of the invention, the oil pellets according to the invention are covered on at least a portion of their surface with an antiagglomerating agent, preferably on all of their surface.

Block of Oil which is Solid at Ambient Temperature

According to one embodiment of the invention, the oil composition which is solid at ambient temperature and which is in divided form is in block form. For the purposes of the invention, the oil composition in block form is also referred to as an "oil block".

The term "block of oil which is solid at ambient temperature" means a block of oil composition according to the invention having a mass of between 1 kg and 1000 kg, preferably between 1 kg and 200 kg, more preferentially between 1 kg and 50 kg, even more preferentially between 5 kg and 25 kg, even more preferentially between 10 kg and 30 kg, said block advantageously being parallelepipedal, preferably being a slab.

The oil block according to the invention preferably has a volume of between 1000 $cm^3$ and 50 000 $cm^3$, preferably between 5000 $cm^3$ and 25 000 $cm^3$, more preferentially between 10 000 $cm^3$ and 30 000 $cm^3$, even more preferentially between 14 000 $cm^3$ and 25 000 $cm^3$.

When the oil block according to the invention is handled manually by a person, the mass of the oil block may range from 1 to 20 kg, and from 20 to 50 kg in the case of handling by two persons. When the handling is performed by mechanical equipment, the mass of the oil block according to the invention may range from 50 to 1000 kg.

The oil block according to the invention is manufactured from the oil composition as described above according to any industrially known process, for example by extrusion, by molding, or according to the manufacturing process described in US 2011/0290695.

The oil block according to the invention is advantageously wrapped in a hot-melt film according to any known process, preferably with a film made of polypropylene, polyethylene or a mixture of polyethylene and polypropylene. The oil composition according to the invention packaged as a block wrapped in a hot-melt film has the advantage of being ready to use, i.e. it may be heated directly in the melting vessel without prior unwrapping, for example for the manufacture of elastomer compositions. The hot-melt material which melts with the oil composition according to the invention does not affect the properties of said oil composition.

The oil block according to the invention may also be covered with antiagglomerating compound as defined below.

In this variant, the preferences, the advantages, the various embodiments described for the antiagglomerating compounds also apply.

The oil block according to the invention may also be packaged in a carton according to any known process.

In particular, the oil block according to the invention is packaged in a carton by hot-pouring the oil composition according to the invention into a carton whose wall of the inner face is silicone-treated, and then cooled, the dimensions of the carton being adapted to the mass and/or volume of the desired oil block.

When the oil block according to the invention is wrapped in a hot-melt film or is packaged in a carton, the Applicant has demonstrated that the deterioration of said hot-melt film or of said carton during the transportation and/or storage at ambient temperature of said oil block according to the invention did not bring about any creep of the oil composition. Consequently, the oil blocks according to the invention retain their initial form and do not stick together during their transportation and/or storage at ambient temperature, despite the fact that the hot-melt film or the carton is damaged. The absence of creep of the oil composition according to the invention in block form during its transportation and/or storage at ambient temperature is due to the presence of the organogelator additive(s) within the oil composition.

Antiagglomerating Compound:

Optionally, as presented above, the oil composition according to the invention which is in divided form which is solid at ambient temperature, for instance in the form of pellets or blocks of oil which is solid at ambient temperature, may be partially coated with one or more antiagglomerating compounds.

The antiagglomerating compound is of mineral or organic origin. The term "antiagglomerating agent" or "antiagglomerating compound" means any compound which limits, reduces, inhibits or retards the agglomeration and/or adhesion of the pellets or blocks with each other during their transportation and/or storage and/or handling at ambient temperature and which, in the case of pellets, also ensures their fluidity during their handling.

More preferentially, the antiagglomerating compound is chosen from: talc; fines, also known as "fillers", generally with a diameter of less than 125 µm, such as siliceous fines, with the exception of calcareous fines; sand such as Fontainebleau sand; cement; carbon; wood residues such as lignin, lignosulfonate, conifer needle powders, conifer cone powders, notably of pine; rice husk ash; glass powder; clays such as kaolin, bentonite, vermiculite; alumina such as alumina hydrates; silica; silica derivatives such as silicates, silicon hydroxides and other silicon oxides; fumed silicas; plastic powder; lime; plaster; rubber crumb; powder of polymers such as styrene-butadiene (SB) copolymers, styrene-butadiene-styrene (SBS) copolymers, and mixtures of these materials.

Advantageously, the antiagglomerating compound is chosen from: fines, generally with a diameter of less than 125 µm; wood residues such as lignin, conifer needle powders and conifer cone powders; fumed silicas; mixtures thereof.

Preferably, the mass of the antiagglomerating agent covering at least a portion of the surface of the oil pellets or blocks is between 0.2% and 10% by mass, preferably between 0.5% and 8% by mass, more preferentially between 0.5% and 5% by mass relative to the total mass of the oil composition according to the invention, in said pellets or said blocks or said balls.

The antiagglomerating layer covering the oil pellets or blocks according to the invention is preferably continuous so that at least 90% of the surface of the oil pellet or block according to the invention is covered with at least one antiagglomerating agent, preferably at least 95%, more preferentially at least 99%. The antiagglomerating layer must be thick enough for it to be continuous.

The pellets or blocks of oil which is solid at ambient temperature are covered with the antiagglomerating agent according to any known process, for example according to the process described in U.S. Pat. No. 3,026,568.

Kit for the Oily Composition which is Solid Under Cold Conditions and which is in Divided Form Another subject of the invention relates to a kit comprising at least:
one oily composition which is solid under cold conditions and which is in divided form as defined above,
one capsule comprising at least one additive as defined above.

According to one embodiment of the invention, the oily composition which is solid under cold conditions and which is in divided form is in block form.

According to one embodiment of the invention, the oily composition in block form comprises, on one of its faces, a cavity for housing all or part of the capsule.

According to one embodiment of the invention, the capsule is totally or partly housed in the cavity in a removable manner.

According to this embodiment, the capsule may be a capsule with a soft envelope, notably a sachet, or a capsule with a hard envelope.

Preferably, the envelope of the capsule is made of hot-melt plastic film, notably of polyethylene, or of silicone.

Another subject of the invention relates to the use of the kit as defined above in the process for preparing an oily composition which is ready for application according to the invention.

According to one embodiment of the invention, the oily composition in block form and the capsule forming the kit as defined above are used in the process for preparing an oily composition simultaneously or consecutively.

In one variant, when the oily composition in block form and the capsule forming the kit as defined above are used consecutively in the process for preparing an oily composition, said oily composition in block form is heated beforehand, and the capsule is then added. In this variant, before heating the block of oily composition, the capsule is removed from the cavity present on one of the faces of the block.

In another variant, the oily composition in block form and the capsule forming the kit as defined above are used simultaneously in the process for preparing an oily composition.

Process for Transporting and/or Storing and/or Handling the Oil Composition which is Solid at Ambient Temperature and which is in Divided Form Another subject of the invention also relates to a process for transporting and/or storing and/or handling the oil composition which is solid at ambient temperature and which is in divided form, the composition being transported and/or stored and/or handled in the form of blocks or pellets of oil composition which is solid at ambient temperature. The oil composition which is solid at ambient temperature and which is in divided form is as described above.

Preferably, the supplemented oil composition of the invention is transported and/or stored at ambient temperature for a time of greater than or equal to 2 months, preferably 3 months.

According to one embodiment of the invention, the oil composition which is solid at ambient temperature of the invention is transported and/or stored at a temperature below 80° C. In particular, the transportation and/or storage temperature corresponds to ambient temperature. The term "ambient temperature" means the temperature which is reached during the transportation and/or storage of the oil composition according to the invention without said composition being heated by any type of process. Thus, the ambient temperature may reach high temperatures, below 80° C. during the summer periods, in particular in geographical regions with a warm climate.

Advantageously, the ambient temperature is from 5° C. to 70° C., preferably from 10° C. to 70° C., more preferentially from 10° C. to 60° C., even more preferentially from 15° C. to 50° C.

The oil compositions which are solid at ambient temperature and which are in divided form according to the present invention are noteworthy in that they allow the transportation and/or storage and/or handling of oil at ambient temperature under optimum conditions, in particular without said solid compositions undergoing creep during their transportation and/or storage and/or handling, even when the ambient temperature is high and without degrading the properties of the composition, or even while improving them.

Use of the Plasticizing Oil Compositions which are Solid at Ambient Temperature

The plasticizer is a substance incorporated into a material to increase its malleability, flexibility or density. Plasticizers are incorporated into rubber and also contribute to the mechanical properties of the elastomer after vulcanization. Plasticizing oils may be introduced up to a proportion of 30% in a tire formulation. They afford the formulator several advantages:

Better transformability of the elastomer, improvement of the mechanical performance, improvement of the cold properties. The solid plasticizing oil compositions of the invention make it possible to provide these same properties to elastomer-based compositions, notably for the formulation of tires. No degradation of the performance qualities has been observed in this application, despite the presence of the organogelator additive(s).

The plasticizing oil compositions of the invention may be used in any type of elastomer composition, whether it is of natural or synthetic origin. The elastomer-based composition may be based on natural rubber (NR) or on synthetic rubber, such as synthetic polyisoprenes (IR) containing cis-1,4 chains, polybutadienes (BR), butadiene-styrene copolymers (SBR), styrene-butadiene-styrene copolymers (SBSR), butadiene-isoprene copolymers (BIR), isoprene-styrene copolymers (SIR), styrene-butadiene-isoprene copolymers (SBIR), ethylene-propylene-diene monomers (EPDM), polyurethanes (PUR), and a mixture of two or more of these elastomers.

The elastomer composition, in particular the tire composition, may also comprise fillers such as carbon black or silica, or other additives such as vulcanization agents, vulcanization retardants.

For the manufacture of tires, the elastomer compositions are currently used in the form of non-vulcanized rubber balls, which are heated as a mixture with the additives. The solid plasticizing oil composition according to the invention may itself also be introduced into the reactor in solid form. This solid formulation has the advantage of facilitating the metering out of the plasticizing oil, but also of the other additives that may be introduced into the plasticizing oil composition, such as the vulcanization agents, vulcanization retardants, fillers.

Use of the Solvent Oil Compositions which are Solid at Ambient Temperature in Ink Compositions In inks, oils of petroleum origin, in particular viscous aromatic oils, are used as solvent for ink compositions of cold-set type.

Cold-set inks, also described as newspaper inks, are inks which dry by absorption into the porous substrate.

These ink compositions are usually composed of pigments, performance additives, resinous binders and solvents. Generally, the pigments represent from 5% to 30% by mass, the resinous binders represent from 15% to 60% by mass, the performance additives represent from 1% to 10% by mass and the solvents, for example hydrocarbon-based solvents, naphthenic oils, viscous aromatic oils and mixtures thereof, represent from 30% to 70% by mass, relative to the total mass of the ink composition. In inks, the function of the solvents is to make it possible to adjust the kinematic viscosity of the composition, to dissolve the resin(s), and to adjust the fluidity of the ink.

More specifically, the viscous aromatic oils serve to wet the dye, for example carbon black, to dissolve it and to disperse it in the polymeric resins of the ink.

The various embodiments, variants, preferences and advantages described above for each of the subjects of the invention apply to all the subjects of the invention and may be taken separately or in combination.

The invention is illustrated by the following examples, which are given without any implied limitation.

Experimental Section:

Example 1: Measurement of the Penetrability of the Supplemented Oily Compositions I— Starting Materials
Oil:
Plaxolene 50®: RAE oil, i.e. an aromatic oil, sold by the company Total under the brand name Plaxolene 50® but also sold under the brand name Scriptane NW 50®.
Plaxolene 50® or Scriptane NW 50® is an RAE (residual aromatic extract) which has:
 a mass per unit volume at 15° C. of between 980 kg/m$^3$ and 1010 kg/m$^3$ (method: ASTM D4052),
 a flash point (Cleveland) of about 230° C. (method: EN ISO 2592),
 a kinematic viscosity at 100° C. of between 60 and 85 mm$^2$/s (method: ASTM D445),
 an aniline point of between 53 and 65° C. (method: ASTM D611).
RAE oil: RAE oil, i.e. an aromatic oil, sold by the company Luberef.
DAE oil: DAE oil, i.e. an aromatic oil, sold by the company Paramo.
Organogelator Agents:
The following was used:
 Compound A1: 2',3-bis[(3-[3,5-di-tert-butyl-4-hydroxy-phenyl]propionyl)]propionohydrazide (CAS 32687-78-8) sold by the company BASF under the brand name Irganox MD 1024.

II—Characterization Methods:
Penetrability: standard ASTM D217 at 25° C.

III—Preparation of Oil Compositions According to the Invention

The oil compositions according to the invention are prepared according to the following general process:
(i) The oil is heated, for example to 170° C.;
(ii) the organogelator additive is added and mixing is performed, for example between 15 min and 2 hours, more specifically between 15 min and 1 hour at 170° C. with a stirring speed of between 400 and 500 rpm;
(iii) when the organogelator additive has completely dissolved, stirring is stopped and the liquid is poured into molds and then left to cool to ambient temperature.

Oil compositions which are solid at ambient temperature C1 to C6 according to the invention are prepared according to the process described above with constituents and proportions (as mass percentage relative to the total mass of oil composition) as follows:

TABLE 1

Oily compositions which are solid under cold conditions according to the invention

|  |  | C1 | C2 | C3 | C4 | C5 | C6 |
|---|---|---|---|---|---|---|---|
| Oil | Plaxolene 50 ® | 99.2% | 99% | 98% | 97% | — | — |
|  | RAE Luberef ® | — | — | — | — | 99.2% | — |
|  | DAE Paramo ® | — | — | — | — | — | 99.2% |
| Organogelator additive | A1 | 0.8% | 1% | 2% | 3% | 0.8% | 0.8% |
| Penetration (1/10 mm) |  | 135 | 119 | 65 | 65 | 130 | 120 |

Compositions C1 to C6 are thus poured into a mold and then left to cool to ambient temperature. After confirming the solidification of compositions C1 to C6 in the mold, compositions C1 to C6 are stripped from the mold and compositions C1 to C6 are obtained in block form which is solid at ambient temperature.

The penetrability of compositions C1 to C6 was measured to determine the solidification of these compositions. The penetrability values of compositions C1 to C6 range from 65 to 135 dmm (Table 1). The lowest penetrability value (65 dmm) is obtained with the composition containing the aromatic oil Plaxolene 50®.

Consequently, in light of the penetrability values of compositions C1 to C6, it is observed that the addition of an organogelator additive to a hydrocarbon-based oil makes it possible to solidify this oil at ambient temperature, which thus makes it possible to transport and/or store and/or handle at ambient temperature this oil in block or pellet form without creep.

Example 2: Measurement of the Creep Resistance of the Oil Compositions According to the Invention 450 g of the oil composition C3 are prepared according to the preparation method described in Example 1 and the composition is then hot-poured into a mold and left to cool. It thus takes the form of an oil block which is solid at ambient temperature measuring 15.5 cm in length, 9.5 cm in width and 4 cm in thickness. The oil block is then stripped from the mold and stored at ambient temperature.

After 12 months of storage at ambient temperature, the penetrability of the oil block is measured. It is 75 dmm.

The oil block is placed under a weight with a mass equivalent to ten times the mass of an oil block, i.e. 4.5 kg. After one week under these conditions, no creep is observed.

Thus, it is clearly seen that the oil blocks which are solid at ambient temperature can be stored for a prolonged period without undergoing creep, their penetrability being stable over time.

The invention claimed is:

1. An oil composition which is solid at ambient temperature, comprising:
   80% to 99.9% of at least one hydrocarbon-based oil of petroleum origin comprising an aromatic oils, paraffinic oil with a content of aromatic compounds of between 30% and 95% by mass relative to the total mass of the aromatic oil,
   0.1% to 10% of at least one organogelator additive selected from the group consisting of:
   a compound of general formula (I):

   Ar1-R—Ar2    (I), wherein:
   Ar1 and Ar2 represent, independently of each other, a benzene nucleus or a system of fused aromatic nuclei of from 6 to 20 carbon atoms, substituted with at least one hydroxyl group, and optionally substituted with one or more $C_1$-$C_{20}$ alkyl groups, and
   R represents an optionally substituted divalent radical, a main chain of which comprises from 6 to 20 carbon atoms and at least one group chosen from amide, ester, hydrazide, urea, carbamate and anhydride functions,
   and
   a compound of general formula (II):

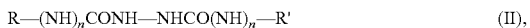
   R—(NH)$_n$CONH—NHCO(NH)$_n$—R'    (II), wherein:
   R and R', which may be identical or different, represent a saturated or unsaturated, linear, branched or cyclic hydrocarbon-based chain, comprising from 1 to 22 carbon atoms, optionally substituted with one or more hydroxyl groups or amine groups, and optionally comprising heteroatoms, $C_5$-$C_{24}$ hydrocarbon-based rings or $C_4$-$C_{24}$ hydrocarbon-based heterocycles comprising one or more heteroatoms; and
   n is an integer having a value of 0 or 1, and
   0% to 10% of one or more other additives,
   the percentages being expressed by mass relative to the total mass of the composition.

2. The composition as claimed in claim 1, wherein the at least one hydrocarbon-based oil further comprises a paraffinic oil with a total content of paraffinic compounds of at least 50% by mass relative to the total mass of the paraffinic oil.

3. The composition as claimed in claim 1, wherein the organogelator additive is a compound of the general formula (II):

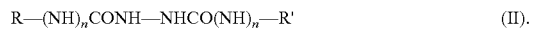
R—(NH)$_n$CONH—NHCO(NH)$_n$—R'    (II).

4. The composition as claimed in claim 1, which is in the form of pellets or blocks.

5. The composition as claimed in claim 1, further comprising at least one capsule comprising at least one additive.

6. The composition as claimed in claim 1, which is part of a composition for the manufacture of tires.

7. The composition as claimed in claim 1, which is part of a composition for the manufacture of an ink.

8. The composition as claimed in claim 1, wherein the content of aromatic compounds is between 50% and 95% relative to the total mass of the aromatic oil.

9. The composition as claimed in claim 8, wherein the content of aromatic compounds is between 60% and 95% relative to the total mass of the aromatic oil.

10. The composition as claimed in claim 1, which comprises from 0.2% to 5% by mass of organogelator additive relative to the total mass of the composition.

11. The composition as claimed in claim 10, which comprises from 0.5% to 3.5% by mass of organogelator additive relative to the total mass of the composition.

12. The composition as claimed in claim 1, wherein the aromatic oil has a kinematic viscosity at 100° C. of between 0.1 and 150 mm$^2$/s.

13. The composition as claimed in claim 12, wherein the aromatic oil has a kinematic viscosity at 100° C. of between 5 and 120 mm$^2$/s.

14. The composition as claimed in claim 13, wherein the aromatic oil has a kinematic viscosity at 100° C. of between 7 and 90 mm$^2$/s.

15. An oil composition which is solid at ambient temperature, comprising:
   80% to 99.9% of at least one hydrocarbon-based oil of petroleum origin comprising an aromatic oil with a content of aromatic compounds of between 30% and 95% by mass relative to the total mass of the aromatic oil,
   0.1% to 10% of at least one organogelator additive selected from the group consisting of:
   a compound of general formula (I):

   Ar1-R—Ar2    (I), wherein:
   Ar1 and Ar2 represent, independently of each other, a benzene nucleus or a system of fused aromatic nuclei of from 6 to 20 carbon atoms, substituted with at least one hydroxyl group, and optionally substituted with one or more $C_1$-$C_{20}$ alkyl groups, and
   R represents an optionally substituted divalent radical, a main chain of which comprises from 6 to 20 carbon atoms and at least one group chosen from amide, ester, hydrazide, urea, carbamate and anhydride functions,
   and
   a compound of general formula (II):

   R—(NH)$_n$CONH—(X)$_m$—NHCO(NH)$_n$—R'    (II), wherein:
R and R', which may be identical or different, represent a saturated or unsaturated, linear, branched or cyclic hydrocarbon-based chain, comprising from 1 to 22 carbon atoms, optionally substituted with one or more hydroxyl groups or amine groups, and optionally comprising heteroatoms, $C_5$-$C_{24}$ hydrocarbon-based rings or $C_4$-$C_{24}$ hydrocarbon-based heterocycles comprising one or more heteroatoms;
X represents a saturated or unsaturated, linear, cyclic or branched hydrocarbon-based chain, comprising from 1 to 22 carbon atoms, which is optionally substituted, and optionally comprising heteroatoms, $C_5$-$C_{24}$ hydrocarbon-based rings or $C_4$-$C_{24}$ hydrocarbon-based heterocycles comprising one or more heteroatoms; and
n and m are integers having a value of 0 or 1, independently of each other,
0% to 10% of one or more other additives, the percentages being expressed by mass relative to the total mass of the composition, and
an oil of plant origin.

16. An oil composition which is solid at ambient temperature, comprising:
80% to 99.9% of at least one hydrocarbon-based oil of petroleum origin comprising an aromatic oil with a content of aromatic compounds of between 30% and 95% by mass relative to the total mass of the aromatic oil,
0.1% to 10% of at least one organogelator additive,
wherein the organogelator additive is a compound of the general formula (I):

$$\text{Ar1-R—Ar2} \qquad (I),$$

wherein:
Ar1 and Ar2 represent, independently of each other, a benzene nucleus or a system of fused aromatic nuclei of from 6 to 20 carbon atoms, substituted with at least one hydroxyl group, and optionally substituted with one or more $C_1$-$C_{20}$ alkyl groups, and
R represents an optionally substituted divalent radical, a main chain of which comprises from 6 to 20 carbon atoms and at least one group chosen from amide, ester, hydrazide, urea, carbamate and anhydride functions, and
0% to 10% of one or more other additives,
the percentages being expressed by mass relative to the total mass of the composition.

17. A process for preparing the oil composition as claimed in claim 1, comprising:
(i) providing the at least one hydrocarbon-based oil, and heating it to a temperature of between 70 and 250° C.,
(ii) adding an organogelator additive and heating the mixture to a temperature of between 70 and 250° C.,
(iii) optionally adding one or more other additives and heating the mixture to a temperature of between 70 and 250° C.,
(iv) shaping the composition, and
(v) cooling to ambient temperature.

18. The process as claimed in claim 17, wherein, in step (i), the at least one hydrocarbon-based oil is heated to a temperature of between 140 and 200° C.

19. A process for transporting, storing or handling a hydrocarbon-based oil of petroleum origin, the process comprising:
preparing the oil composition of claim 1 which is in the form of blocks or pellets which are solid at ambient temperature and which is in divided form, and
transporting, storing or handling the oil composition in the form of blocks or pellets.

* * * * *